(12) United States Patent
Poursohi et al.

(10) Patent No.: US 9,163,938 B2
(45) Date of Patent: *Oct. 20, 2015

(54) SYSTEMS AND METHODS FOR IMAGE ACQUISITION

(75) Inventors: Arshan Poursohi, Berkeley, CA (US); Anthony Gerald Francis, Jr., San Jose, CA (US)

(73) Assignee: Google Inc., Mountain View, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/594,911

(22) Filed: Aug. 27, 2012

(65) Prior Publication Data

US 2014/0022355 A1 Jan. 23, 2014

Related U.S. Application Data

(60) Provisional application No. 61/673,765, filed on Jul. 20, 2012.

(51) Int. Cl.
*G01B 11/25* (2006.01)

(52) U.S. Cl.
CPC .................. *G01B 11/2513* (2013.01)

(58) Field of Classification Search
CPC .......... H04N 13/0239; H04N 13/0296; H04N 13/0055; H04N 2013/0081; G06T 7/0022
USPC ...................................................... 348/42–48
IPC .................................................. H04N 13/0239
See application file for complete search history.

(56) References Cited

U.S. PATENT DOCUMENTS

| | | | | |
|---|---|---|---|---|
| 5,461,478 A | * | 10/1995 | Sakakibara et al. | 356/623 |
| 6,341,016 B1 | * | 1/2002 | Malione | 356/603 |
| 6,664,531 B2 | * | 12/2003 | Gartner et al. | 250/208.1 |
| 7,164,789 B2 | * | 1/2007 | Chen et al. | 382/154 |
| 7,200,262 B2 | * | 4/2007 | Sawada | 382/154 |
| 7,978,925 B1 | | 7/2011 | Souchard | |
| 8,090,194 B2 | * | 1/2012 | Golrdon et al. | 382/154 |
| 8,098,275 B2 | * | 1/2012 | Keating et al. | 348/40 |
| 8,208,719 B2 | * | 6/2012 | Gordon et al. | 382/154 |
| 2002/0006217 A1 | | 1/2002 | Rubbert et al. | |

(Continued)

FOREIGN PATENT DOCUMENTS

| | | |
|---|---|---|
| DE | 44 16 108 | 11/1995 |
| DE | 198 52 149 | 5/2000 |

(Continued)

OTHER PUBLICATIONS

Website: Autodesk 123D Catch. www.123dapp.com/catch, 2013.

(Continued)

*Primary Examiner* — Tung Vo
(74) *Attorney, Agent, or Firm* — McDonnell Boehnen Hulbert & Berghoff LLP

(57) ABSTRACT

Methods and systems for image acquisition are described. In an example, a computing device may be configured to cause incremental relative rotation of a projector with respect to an image-capture device through multiple discrete angles. At each angle of the multiple discrete angles, the computing device may be configured to cause the image-capture device to capture a first image of an object, cause the projector to project a pattern on the object, and cause the image-capture device, while the pattern is projected on the object, to capture a second image of the object.

19 Claims, 6 Drawing Sheets

(56) References Cited

U.S. PATENT DOCUMENTS

| | | |
|---|---|---|
| 2002/0141614 A1 | 10/2002 | Lin |
| 2003/0002016 A1 | 1/2003 | Sellen et al. |
| 2003/0066949 A1 | 4/2003 | Mueller et al. |
| 2003/0160970 A1* | 8/2003 | Basu et al. .................. 356/601 |
| 2003/0175024 A1 | 9/2003 | Miyoshi et al. |
| 2004/0222987 A1* | 11/2004 | Chang et al. ................ 345/419 |
| 2005/0283065 A1 | 12/2005 | Babayoff |
| 2006/0210146 A1 | 9/2006 | Gu |
| 2006/0268153 A1* | 11/2006 | Rice et al. .................... 348/370 |
| 2007/0009859 A1 | 1/2007 | Preston et al. |
| 2007/0046663 A1* | 3/2007 | Brinkmann et al. ......... 345/419 |
| 2008/0123937 A1 | 5/2008 | Estrada et al. |
| 2008/0232679 A1* | 9/2008 | Hahn et al. ................... 382/154 |
| 2008/0246757 A1* | 10/2008 | Ito ................................. 345/419 |
| 2009/0097039 A1 | 4/2009 | Kawasaki et al. |
| 2009/0324135 A1 | 12/2009 | Kondo et al. |
| 2010/0215250 A1 | 8/2010 | Zhu |
| 2012/0063672 A1* | 3/2012 | Gordon et al. ................ 382/154 |
| 2014/0028805 A1* | 1/2014 | Tohme ............................ 348/47 |

FOREIGN PATENT DOCUMENTS

| | | |
|---|---|---|
| WO | 02/086420 A1 | 10/2002 |
| WO | 2004/011876 | 2/2004 |
| WO | 2011/120526 A1 | 10/2011 |

OTHER PUBLICATIONS

International Searching Authority, International Search Report and Written Opinion for PCT/US2013/048099 mailed Sep. 17, 2013, 12 pages.

Perkin Elmer 1100 Series FX-1160 Data Sheet, 2001, 2 pages.

Non-Final Office Action issued in Co-Pending U.S. Appl. No. 13/958,776.

* cited by examiner

COMPUTER PROGRAM PRODUCT 600

SIGNAL BEARING MEDIUM 601

PROGRAM INSTRUCTIONS 602

- CAUSING, BY A COMPUTING DEVICE, INCREMENTAL RELATIVE ROTATION OF A PROJECTOR WITH RESPECT TO AN IMAGE-CAPTURE DEVICE THROUGH MULTIPLE DISCRETE ANGLES

- AT EACH ANGLE OF THE MULTIPLE DISCRETE ANGLES:

- CAUSING, BY THE COMPUTING DEVICE, THE IMAGE-CAPTURE DEVICE TO CAPTURE A FIRST IMAGE OF THE OBJECT

- CAUSING, BY THE COMPUTING DEVICE, THE PROJECTOR TO PROJECT A PATTERN ON THE OBJECT

- CAUSING THE IMAGE-CAPTURE DEVICE, WHILE THE PATTERN IS PROJECTED ON THE OBJECT, TO CAPTURE A SECOND IMAGE OF THE OBJECT

| COMPUTER READABLE MEDIUM 603 | COMPUTER RECORDABLE MEDIUM 604 | COMMUNICATIONS MEDIUM 605 |

FIGURE 6

SYSTEMS AND METHODS FOR IMAGE ACQUISITION

CROSS REFERENCE TO RELATED APPLICATION

The present application claims priority to U.S. Provisional patent application Ser. No. 61/673,765, filed on Jul. 20, 2012, and entitled "Systems and Methods for Image Acquisition," which is herein incorporated by reference as if fully set forth in this description.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a 3D image. 3D object data models represent a 3D object using a collection of points in 3D space, called a point cloud, optionally connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be digitally photographed from a number of different angles, and the images can be combined to generate the 3D image of the object. As still another example, a projector can be used to project a pattern of structured light onto the object, which can be digitally photographed and processed into a 3D model.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

The present application discloses systems and methods for image acquisition. In one aspect, a method is described. The method may comprise causing, by a computing device, incremental relative rotation of a projector with respect to an image-capture device through multiple discrete angles. At each angle of the multiple discrete angles, the method may comprise causing, by the computing device, the image-capture device to capture a first image of an object, causing, by the computing device, the projector to project a pattern on the object, and causing the image-capture device, while the pattern is projected on the object, to capture a second image of the object.

In still another aspect, a system is described. The system may comprise a rotatable surface. The system may also comprise a projector coupled to the rotatable surface. The system further may comprise an image-capture device, where the rotatable surface and the projector may be configured to rotate relative to the image-capture device. The system also may comprise a computing device configured to cause rotation of the rotatable surface and in communication with the image-capture device and the projector. The computing device further may be configured to cause the rotatable surface and the projector to incrementally rotate through multiple discrete angles relative to the image-capture device. At each angle of the multiple discrete angles, the computing device may be configured to cause the image-capture device to capture a first image of an object placed on the rotatable surface, cause the projector to project a pattern on the object, and cause the image-capture device, while the pattern is projected on the object, to capture a second image of the object.

In another aspect, a non-transitory computer readable medium having stored thereon instructions executable by a computing device to cause the computing device to perform functions is described. The functions may comprise causing a rotatable surface and an image-capture device coupled to the rotatable surface to incrementally rotate through multiple discrete angles relative to a projector. At each angle of the multiple discrete angles, the functions may comprise causing the image-capture device to capture a first image of an object, causing the projector to project a pattern on the object, and causing the image-capture device, while the pattern is projected on the object, to capture a second image of the object.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6 is a schematic illustrating a conceptual partial view of an example computer program product that includes a computer program for executing a computer process on a computing device, arranged according to at least some embodiments presented herein.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In an example, a computing device may be configured to cause incremental relative rotation of a projector with respect to an image-capture device (e.g., a camera) through multiple discrete angles. At each angle of the multiple discrete angles, the computing device may be configured to cause the image-capture device to capture a first image of an object, cause the projector to project a pattern on the object, and cause the image-capture device, while the pattern is projected on the object, to capture a second image of the object.

In one example, the projector may be fixed from a perspective of the object such that incremental relative rotation of the projector with respect to the image-capture device indicates a respective incremental relative rotation of the image-capture device relative to the object.

Incremental relative rotation of the projector with respect to the image-capture device may indicate, for example, that the image-capture device is stationary while the projector may be rotating. In another example, the image-capture device may be stationary while the projector may be rotating. In still another example, both the projector and the image-capture device may be rotating relative to each other.

Figure 1:
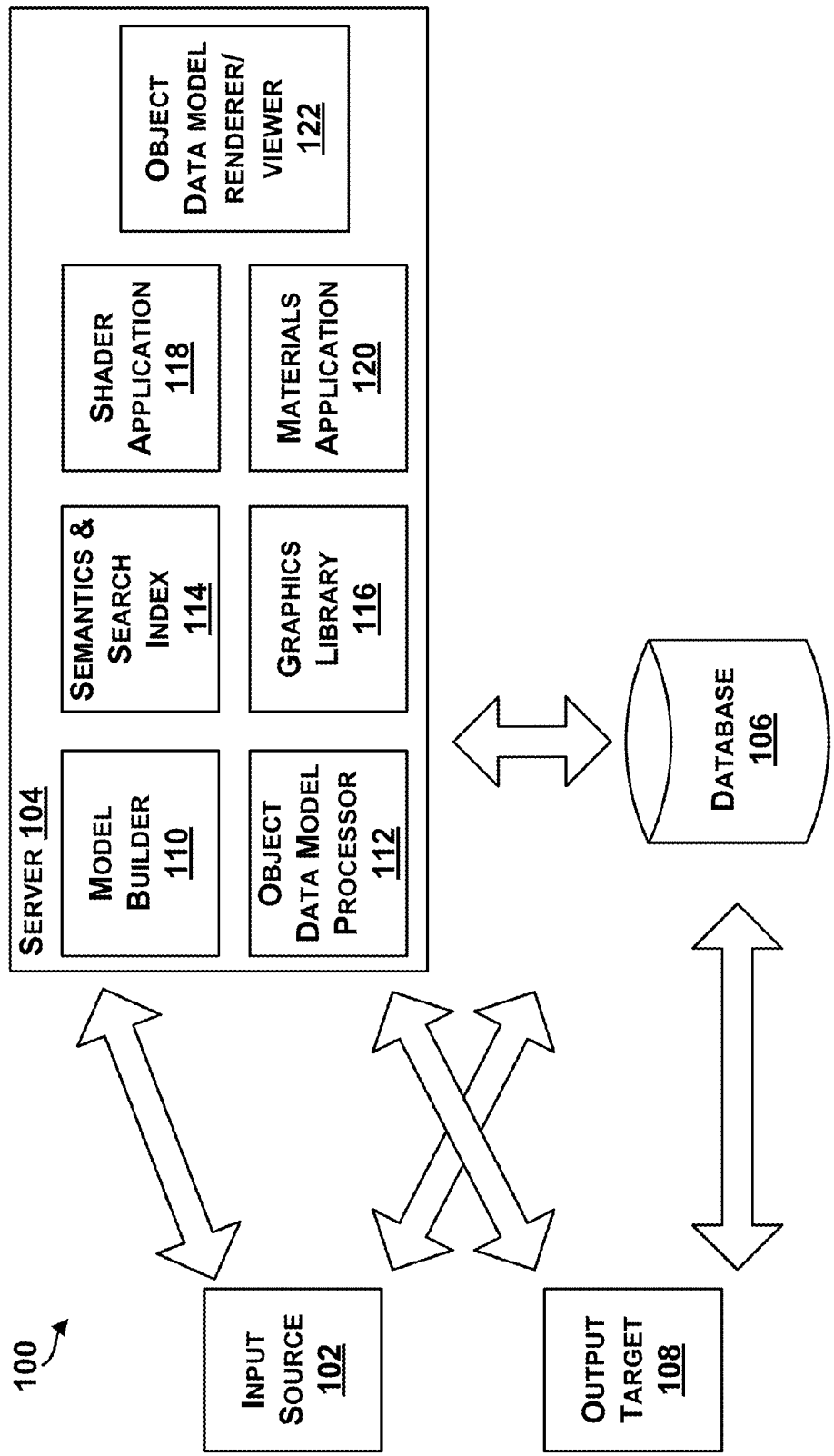
FIG. 1 illustrates an example system for object data modeling, in accordance with an embodiment.

Referring now to the figures, FIG. 1 illustrates an example system 100 for object data modeling, in accordance with an embodiment. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets H that have colors but no UV (coordinate system of a 2D texture space) unwrapping to generate a mesh D with UV unwrapping but no colors. As an example, for a single output texture pixel of an image processing may include, for a given point in UV determine a triangle in the mesh's UV mapping D, and using triangle-local coordinates, move to an associated 3D point on the mesh. A bidirectional ray may be cast along the triangle's normal to intersect with the mesh H, and color, normal and displacement may be used for an output. To generate an entire texture image, each pixel in the image can be processed.

In some examples, the model builder 110 or the object data model processor 112 may output a 3D object data model of an object that includes one file with a combination of all data needed to render a 3D image of the object. In other examples, the model builder 110 or the object data model processor 112 may output a 3D object data model in the form of multiple files so that the 3D object data model file is divided into smaller parts.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or the files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model Annotations may be used to label any aspect of an image or 3D object data model, or to provide any type of information Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or to files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions so that the materials application 120 can be executed to render the separate distinct portions. As an example, a hood on a car may include a hood ornament, and the hood may be painted and the ornament may be chrome. The materials application 120 and the shader application 118 can be executed to identify two separate materials and render each material with an appropriate shade.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
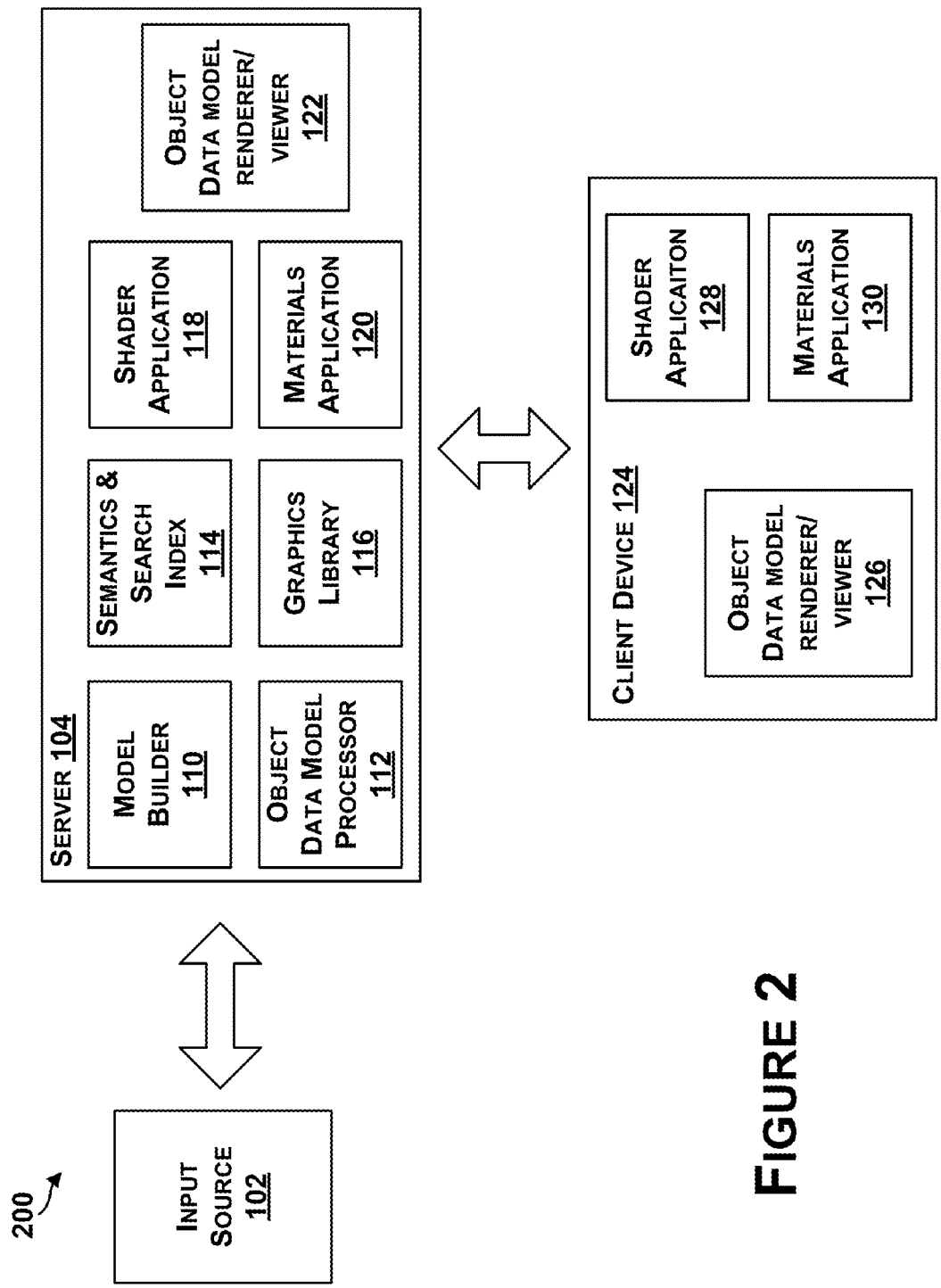
FIG. 2 illustrates another example system for object data modeling, in accordance with an embodiment.

FIG. 2 illustrates another example system 200 for object data modeling, in accordance with an embodiment. The system 200 includes the input source 102 coupled to the server 104, which is coupled to a client device 124. The input source 102 and the server 104 may be as described in FIG. 1. The client device 124 may receive outputs from any of the components of the server 124, and may be configured to render a 3D image.

The client device 124 includes an object data model renderer/viewer 126, a shader application 128, and a materials application 130. The object data model renderer/viewer 126, the shader application 128, and the materials application 130 may all be configured as described with respect to the object data model renderer/viewer 122, the materials application 120, and the shader application 118 of the server 104 as described with respect to FIG. 1.

In some examples, the client device 124 may receive the 3D object data model file or files from the server 104 and render a 3D image of the object by executing the shader application 128 and the materials application 130. When executing the shader application 128 and the materials application 130, the client device 124 may access separate databases to retrieve appropriate shader and material information to apply to the image, access the server 104 to receive appropriate shader and material information from the shader application 118 and the materials application 120, or may store information locally regarding the appropriate shader and material information to apply.

In some examples, the client device 124 may receive the 3D object data model file or files from the server 104 and render a 3D image of the object. In other examples, the server 104 may render a 3D image of the object and stream the 3D image to the client device 124 for display.

As described, in some examples, the 3D object data model may include various forms of data, such as raw image data captured, mesh data, processed data, etc. Data of the 3D object data model may be encoded and compressed so as to store information related to 3D geometry of an object associated with information related to appearance of the object for transmission and display within a web browser or application on a device.

In one example, data of the 3D object data model may be compressed by initially encoding a triangle mesh representing the 3D object as a list including a plurality of vertices and a plurality of indices. Each vertex in the list may have several arbitrary parameters associated with the vertex, including, but not limited to, position, surface normal, and texture coordinates. The triangle indices may be stored in a 16-bit unsigned integer format and vertex attributes may be stored in a 32-bit floating point format. The 32-bit floating point format vertex attributes may be reduced to 15-bits. In instances in which compressed data is for a version of a web browser or application that does not have the ability to decompress dictionary encoded data, a delta compression may be used to store differences between the triangle indices and vertex attributes, either in an array of structures layout or a transposed layout. After delta compression, post-delta data may be ZigZag encoded (e.g., using open-source Protocol Buffer library available from Google Inc.). Encoding may follow the format ZigZag(x): (x<<1)^ (x>>15) with a corresponding decoding (during decompression) to follow the format UnZigZag(x): (x>>1)^(-(x & 1)). ZigZag encoding may be followed by multi-byte character encoding using UTF-8 encoding. Finally, the UTF-8 encoded data may be compressed using GNU Gzip or bzip2 to generate a compressed 3D object data model file.

The compressed copy of the 3D object data model file may be stored in a database, such as the database 106 in FIG. 1, in the server 104, or on the client device 124, for example. In some examples, the compressed 3D object data model file may be provided by the server 104 to the client device 124 in response to a request from the client device 124. If using a web browser to view the 3D object data model file, the client device 124 may decompress the compressed 3D object data model file according to Java instructions provided in the object browser web page. A local copy of the object browser web page and a local copy of the uncompressed, searchable data of the 3D object data model file can be stored in local memory of the client device 124. The client device 124 may display exemplary screenshots of an initial default view of a 3D object, based on the searchable data of the 3D object data model file loaded in the web browser.

In some examples, the 3D object data file includes information as to geometry of an object sorted by material and divided into portions to be loaded as fragments and reassembled in portions by the client device. As one example, for a mobile phone comprising multiple parts, each part may be rendered using a separate or distinct shader for each material. Thus, the 3D object data file may be divided into multiple portions and compressed as described above to retain all portions. The client device may receive the compressed 3D object data file, decompress the file, and reassemble the portions of the object one-by-one by loading each fragment of the file, streaming file requests for each shader, and reassembling an image of the object.

Figure 3:
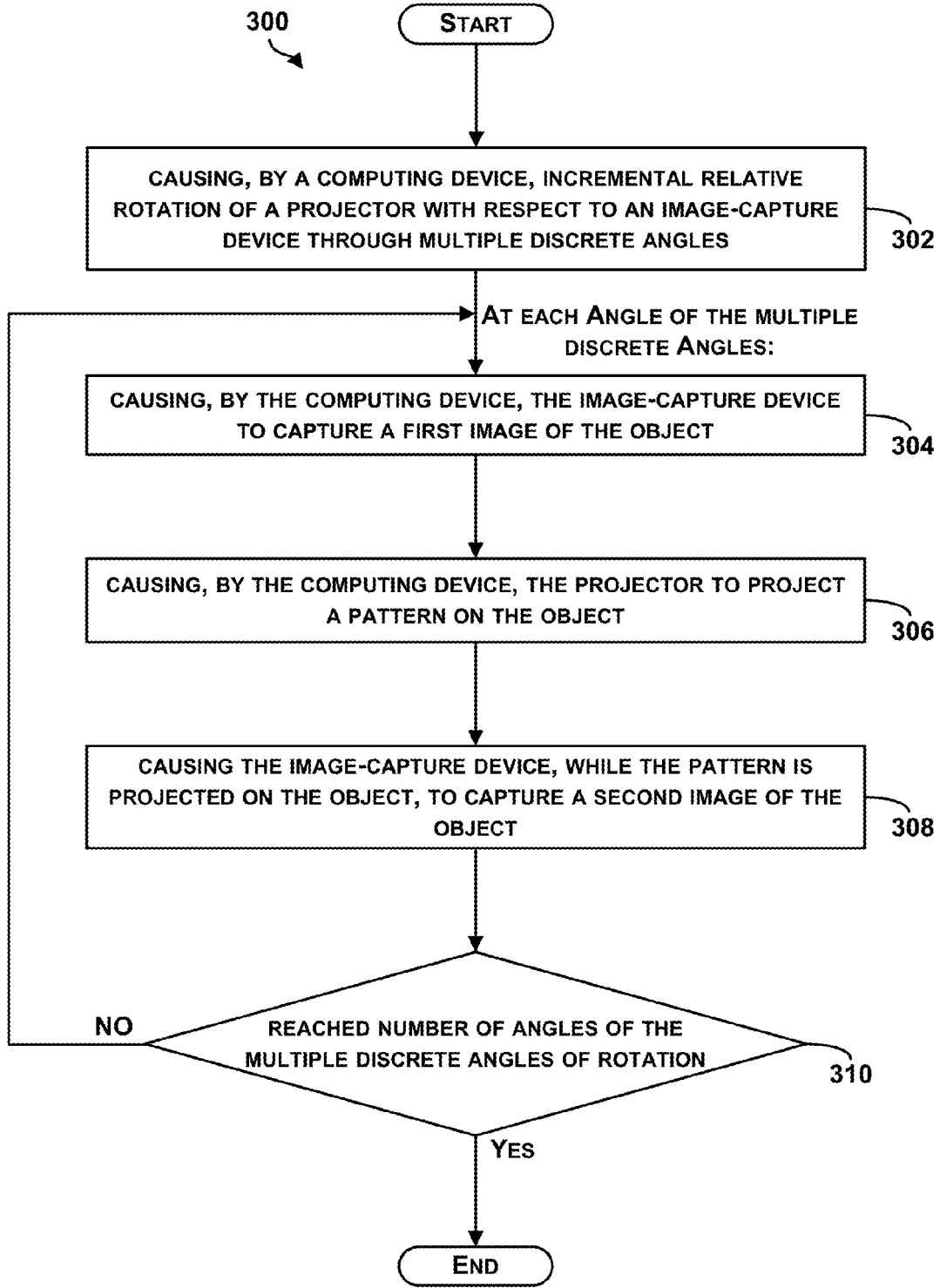
FIG. 3 illustrates a flowchart of an example method for image acquisition, in accordance with an embodiment.
Figure 4A:
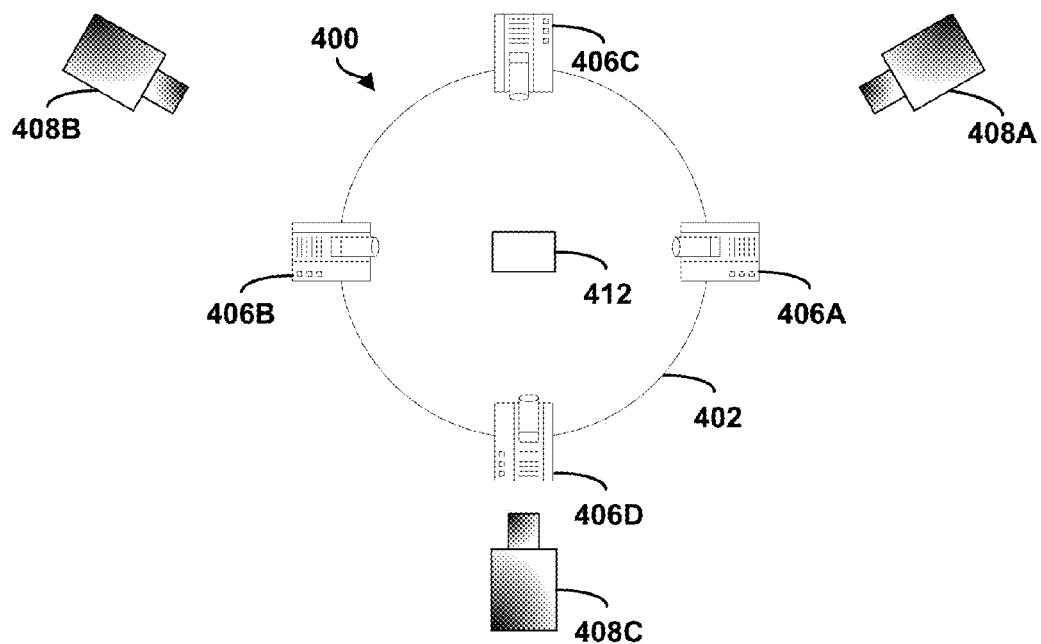
FIG. 4A illustrates a top view of an example system for image acquisition, in accordance with an embodiment.
Figure 4B:
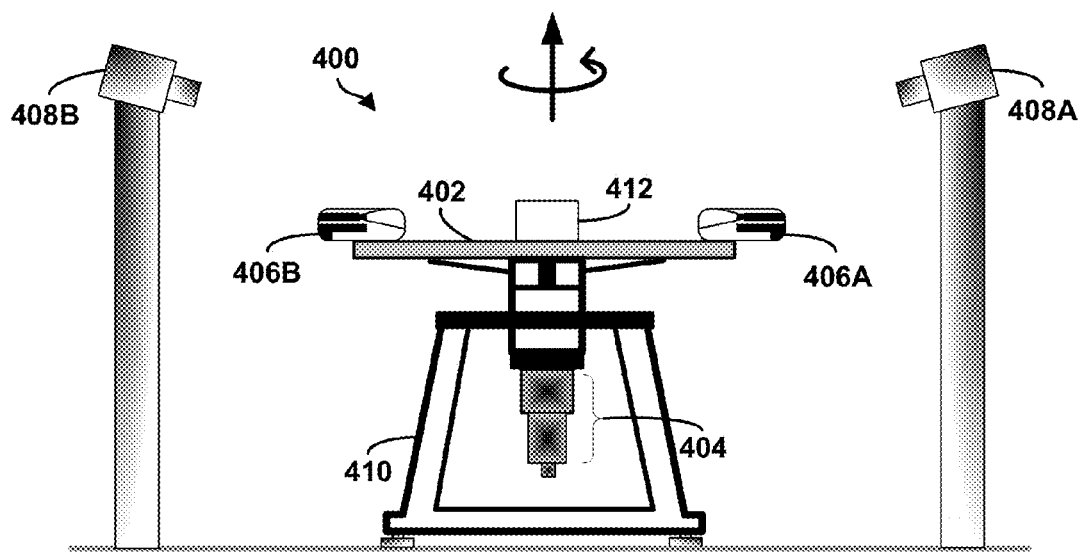
FIG. 4B illustrates a front view of the example system for image acquisition, in accordance with an embodiment.

As described above, the systems 100 or 200 may be used to acquire data (e.g., images) of an object, process the data to generate a 3D object data model, and render the 3D object data model for display. FIG. 3 illustrates a flowchart of an example method 300 for image acquisition, in accordance with an embodiment. The method 300 shown in FIG. 3 presents an embodiment of a method that could be used by the systems 100 or 200 of FIGS. 1-2, for example. FIG. 4A illustrates a top view of an example system 400 for image acquisition, in accordance with an embodiment and FIG. 4B illustrates a front view of the example system for image acquisition, in accordance with an embodiment. FIGS. 3, 4A-4B will be described together The method 300 may include one or more operations, functions, or actions as illustrated by one or more of blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 300 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 causing, by a computing device, incremental relative rotation of a projector with respect to an image-capture device through multiple discrete angles. In an example, the projector may be coupled to a first surface, and the image-capture device may be coupled to a second surface. The computing device may be configured to rotate one or both of the first surface and the second surface to cause the incremental relative rotation of the projector relative to the image-capture device. As an example, the computing device may be configured to rotate the first surface while the second surface, to which the image-capture device is coupled, may remain stationary. In another example, the projector may remain stationary while the computing device may be configured to rotate the second surface, to which the image-capture device is coupled, to cause the incremental relative rotation. In still another example, the computing device may be configured to rotate both the projector and the image-capture device, or the first the surface and the second surface, to cause the incremental relative rotation. In some examples, more than one image-capture device and more than one projector may be used.

In an example, the computing device may be configured to incrementally rotate the first surface or the second surface to discrete angles through a 360° rotation.

The system 400 in FIGS. 4A-B may include a rotatable surface 402 that the computing device may be configured to cause to incrementally rotate to multiple discrete angles using a drive system 404. The rotatable surface 402 is shown as a circular surface for illustration only. Other shapes are possible. The drive system 404 may, for example, include one or more motors and motor drive systems configured to receive commands from the computing device and control rotation of the one or more motors. In some examples, the rotating surface 402 may be configured to be rotated manually. Other drive systems are possible.

The system 400 may include projectors 406A-D coupled to the rotatable surface 402. In one example, the projectors 406A-D may be affixed to the rotatable surface 402. Four projectors 406A-D are shown for illustration only. More or less projectors may be used. In the example system 400, the projectors 406A-D are coupled to the rotatable surface 402 such that the computing device is configured to cause the rotatable surface 402 to rotate using the drive system 404 and accordingly cause a respective rotation of the projectors 406A-D.

The system 400 also may include image-capture devices such as cameras 408A-C. Three cameras 408A-C are shown for illustration only. More or less cameras may be used. In the example system 400, the cameras 408A-C are shown to be stationary and not rotatable with the rotatable surface 402. However, configuration of the system 400 is for illustration only, and other arrangements are possible. For example, in other configurations, the cameras 408A-C may be rotatable while the projectors 406A-D may be stationary. The location and arrangement of the projectors 406A-D and the cameras 408A-C are for illustration only. Other configurations, locations, and arrangements are possible.

The system 400 may include a support 410, as shown in FIG. 4B, that is configured to support the rotatable surface 402, the drive system 404, and the projectors 406A-D. Configuration of the support 410 shown in FIG. 4B is for illustration only. Other support configurations are possible.

The system 400 may be configured to acquire images of an object 412 that is placed on the rotatable surface 402. The object 412 can be any object (e.g., a bag, a shoe, a phone, etc.).

As illustrated in FIGS. 4A-B, the projectors 406A-D may be configured to be fixed from a perspective of the object 412 as the rotatable surface 402 rotates. As an example, the computing device may be configured to cause the rotatable surface 402 to rotate to eight discrete angles (e.g., 45°, 90°, 135°, 180°, 225°, 270°, 315°, and 360°) from a given starting point, and accordingly cause the projectors 406A-D coupled to the rotating surface 402 and the object 412 placed on the rotatable surface 402 to rotate with the rotatable surface 402. In this example, the computing device, by causing the rotatable surface 402 to rotate, may be configured to cause the incremental relative rotation of the projectors 406A-D relative to the cameras 408A-C, which entails causing a respective incremental relative rotation of the cameras 408A-C relative to, or from a perspective of, the object 412. Also, in this example, the projectors 406A-D may be fixed from the perspective of the object 412, i.e., the projectors 406A-D appear fixed, or have a fixed orientation, from the perspective of the object 412. However, in other examples, the projectors 406A-D may be configured to rotate relative to the object 412 as well.

Many different rotation/scanning arrangements are possible, and the nature of the object being scanned and/or objective of the scanning may suggest the desired orientation and rotation as well as the arrangement of projectors and cameras. As an example for illustration, a camera may move around an object in a way similar to a baseball seam.

Referring back to FIG. 3, at block 304, at each angle of the multiple discrete angles of rotation, the method 300 includes causing, by the computing device, the image-capture device to capture a first image of an object. At a given angle of rotation, of the multiple discrete angles, the computing device may be configured to cause one or more of the cameras 408A-C to capture a first image or a first set of images of the object 412. The computing device may be configured to cause the cameras 408A-C to capture images at different elevations at the given angle of rotation.

In one example, the rotatable surface 402 may be made of a transparent material and the cameras 408A-C may be configured to capture some images of the first set of images from a given elevation (e.g., below the rotatable surface 402) that allows capturing images of a bottom view of the object 412 through the transparent rotatable surface 402.

Referring back to FIG. 3, at block 306, at each angle of the multiple discrete angles of rotation, the method 300 includes causing, by the computing device, the projector to project a pattern on the object. In an example, each of the projectors 406A-D may include a respective light source. In this example, the computing device may be configured to control the light source to project a pattern on the object 412, where the pattern is made of light emitted from the light source. The pattern may be simple (e.g., dots tracing a curve), or complex (e.g., a flower).

The light source may generally include any type of an electromagnetic radiation source. Light source and electromagnetic radiation source are used interchangeably herein. The electromagnetic radiation source may be configured to project light of any wavelength, visible or invisible. For example, the electromagnetic radiation source may be configured to project visible light such as laser beams with different colors and may additionally or alternately be configured to project invisible light such as infrared light. The computing device may be configured to switch on or activate the projectors 406A-D to project the pattern on the object 412, and may be configured to switch off or deactivate the projectors 406A-D to remove the pattern. Multiple patterns can be projected on the object 412. In examples, patterns may be projected on substantially all parts (e.g., sides, edges, etc.) of the object 412 and may include multiple colors.

Referring back to FIG. 3, at block 308, at each angle of the multiple discrete angles of rotation, the method 300 includes causing the image-capture device, while the pattern is projected on the object, to capture a second image of the object.

One or more of the cameras 408A-C may be configured to capture, and capable of capturing, while the pattern is projected on the object 412, a second image or a second set of images that depict the pattern projected by the projectors 406A-D on the object 412. For example, if the projectors 406A-D include electromagnetic radiation sources that project invisible infrared light patterns on the object, the cameras 408A-C configured to capture the second image or second set of images may include infrared cameras capable of capturing images of the object 412 while the infrared light pattern is projected on the object 412.

In an example, the same cameras (e.g., of the cameras 408A-C) used to capture the first image or the first set of images may be configured to capture the second image or the second set of images. In some examples, a first camera of the cameras 408A-C may be configured to capture the first image and a second camera of the cameras 408A-C may be configured to capture the second image. In these examples, the first camera and second camera may be configured to differ with respect to a given imaging parameter. For example, the first camera may be configured to capture higher resolution images to capture details (e.g., colors, texture, etc.) of the object 412, while the second camera may be configured to capture lower resolution images of the object 412. Other examples of imaging parameters that can be configured differently between the first camera and the second camera may include aperture, focal depth, etc.

If the same camera or cameras (of the cameras 408A-C) are used to capture both the first image or set of images and the second image or set of images, the camera(s) may be configured for given imaging parameter(s) to capture the first image or set of images, then the imaging parameter(s) may be adjusted before capturing the second image or set of images, for example.

Referring back to FIG. 3, at block 310, the method 300 determines whether the number of angles of the multiple discrete angles of rotation is reached. If the number of angles of the multiple discrete angles of rotation is not reached, the computing device may be configured to cause the rotatable surface 402, the projectors 406A-D, and the object 412, using the drive system 404, to rotate to another given angle of the multiple discrete angles of rotation. At this given angle of rotation, the computing device further may be configured to cause the projectors 406A-D to switch off pattern projection on the object 412; cause one or more of the cameras 408A-C to capture a respective first image or first set of images of the object 412; cause the projectors 406A-D to project the pattern on the object; and cause one or more of the cameras 408A-C to capture a respective second image or second set of images of the object 412, i.e., repeat steps of the method 300 described in blocks 304, 306, and 308.

These steps may be repeated at each angle until the number of angles of the multiple discrete angles of rotation is reached. As an example for illustration, the computing device may be configured to cause the rotatable surface 402, the projectors 406A-D, and the object 412 to incrementally rotate to eight discrete angles and repeat capturing respective first image or first set of images, projecting pattern on the object 412, capturing respective second image or second set of images at each of the eight discrete angles. In this example, assuming three cameras 408A-C are capturing images of the object 412, the first set of images and the second set of image will include twenty four images each. Images of the second set of images would depict the pattern projected on the object 412 by the projectors 406A-D.

Number of angles of the multiple discrete angles of rotation may vary based on complexity of the object 412, for example. Images from fewer angles may be captured for a symmetric object, for example, than for a more complex object that is not symmetric. In addition, various lighting or backgrounds may be applied to the object, and images may be captured depicting the variations.

When the projectors 406A-D are fixed from the perspective of the object 412 as the rotatable surface 402 rotates, the pattern projected on the object 412 may be fixed while the cameras 408A-C capture the second set of images of the object 412, and the pattern projected on the object 412, from the different angles of the multiple discrete angles of rotation.

In some examples, upon capturing images of the object 412 from the multiple discrete angles of rotation, a given computing device may be configured to match portions of the pattern in each image of the second set of images to corresponding portions of the pattern in given images of the second set of images that are spatially neighboring, based on respective capture angles/locations, to that image so as to spatially align the images of the second set of images.

As described above, as an example, the images of the second set of images may be of a lower resolution as compared to the images of the first set of images. The given computing device may be configured to use such lower resolution images for alignment as opposed to using high resolution images of the first set of images, to increase computational efficiency of the given computing device while performing image alignment.

The given computing device may be configured to determine images of the first set of images that correspond to (e.g., captured from the same angles) the aligned images of the second set of images. The given computing device further may be configured to generate a 3D visualization of the object 412 from the respective images of the first set of images that correspond to the aligned images of the second set of images. As described above, the images of the first set of images may be high resolution images to capture details (e.g., texture, colors, etc.) of the object. The given computing device may be configured to create a 3D model of the object using the respective images of the first set of images determined to correspond to the aligned images of the second set of images such that a user of the 3D visualization of the object may be able to view fine details of the object. Using the generated 3D visualization, the user may be able to view the object from any angle and zoom in and out, for example.

Figure 5:
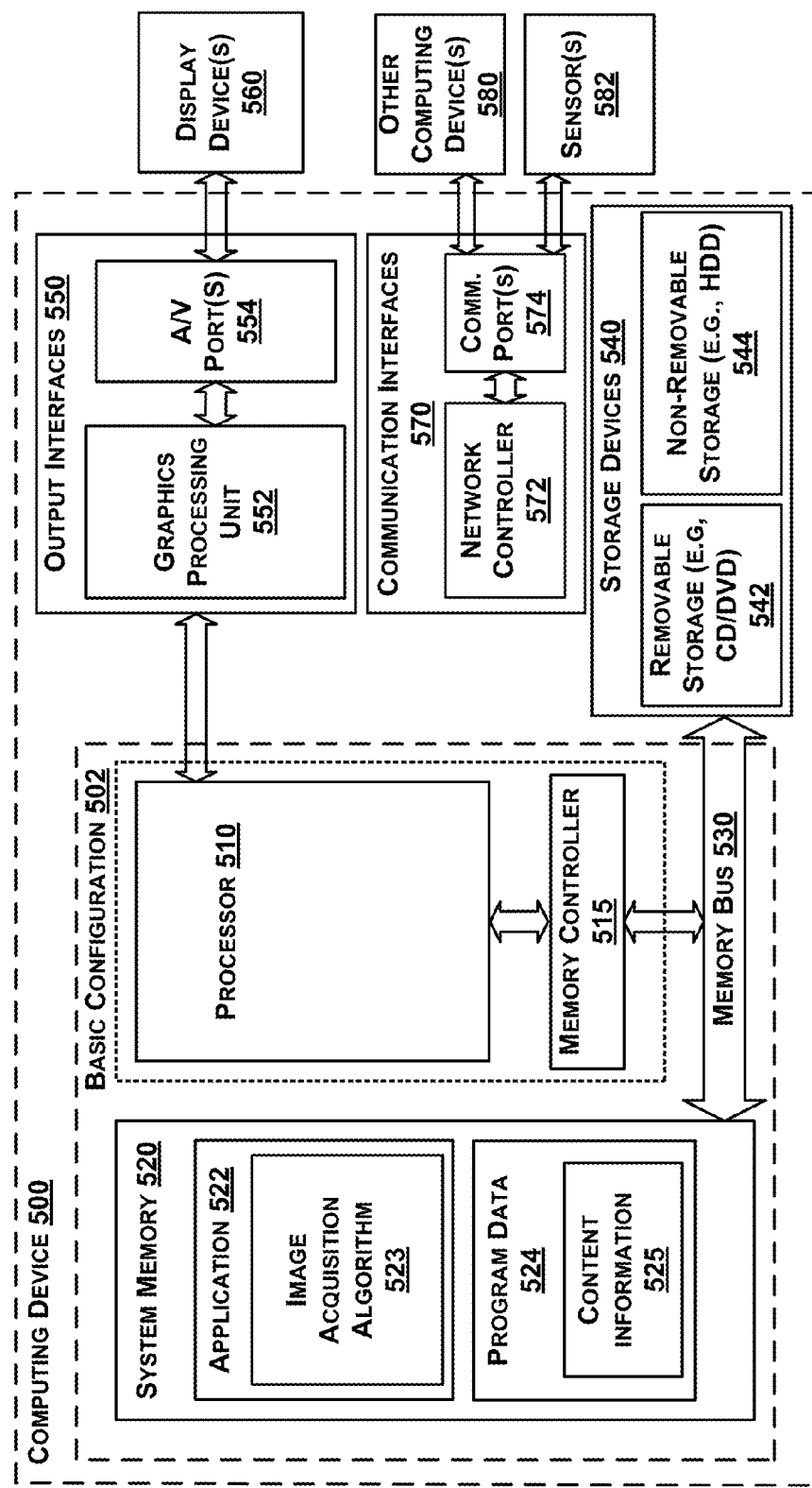
FIG. 5 is a functional block diagram illustrating an example computing device used in a computing system that is arranged in accordance with at least some embodiments described herein.

FIG. 5 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for image acquisition as described in FIGS. 1-4. The computing device 500 may, for example, be used to implement the method 300 illustrated in FIG. 3.

In a basic configuration 502, computing device 500 may typically include one or more processors 510 and system memory 520. A memory bus 530 can be used for communicating between the processor 510 and the system memory 520. Depending on the desired configuration, processor 510 can be of any type including but not limited to a microprocessor (µP), a microcontroller (µC), a digital signal processor (DSP), or any combination thereof. A memory controller 515 can also be used with the processor 510, or in some implementations, the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 may include one or more applications 522, and program data 524. Application 522 may include image acquisition algorithm 523. Program data 524 may include content information 525 that could be directed to any number of types of data. In some example embodiments, application 522 can be arranged to operate with program data 524 on an operating system.

Computing device 500 can have additional features or functionality, and additional interfaces to facilitate communications between the basic configuration 502 and any devices and interfaces. For example, data storage devices 540 can be provided including removable storage devices 542, non-removable storage devices 544, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 520 and storage devices 540 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 500. Any such computer storage media can be part of the computing device 500.

The computing device 500 can also include output interfaces 550 that may include a graphics processing unit 552, which can be configured to communicate to various external devices such as display devices 560 or speakers via one or more A/V ports 554 or a communication interface 570. The communication interface 570 may include a network controller 572, which can be arranged to facilitate communications with one or more other computing devices 580 and one or more sensors 582 over a network communication via one or more communication ports 574. The one or more sensors 582 are shown external to the computing device 500, but may also be internal to the device. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 601. The signal bearing medium 601 may include one or more programming instructions 602 that, when executed by one or more processors may provide functionality or portions of the functionality described above with respect to FIGS. 1-5. In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device 500 of FIG. 5 may be configured to provide various operations, functions, or actions in response to the programming instructions 602 conveyed to the computing device 500 by one or more of the computer readable medium 603, the computer recordable medium 604, and/or the communications medium 605.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
causing, by a computing device, incremental relative rotation of a projector with respect to an image-capture device through multiple discrete angles;
at each angle of the multiple discrete angles:
causing, by the computing device, the image-capture device to capture a first image of an object;
causing, by the computing device, the projector to project a pattern on the object, after the first image is captured; and
causing the image-capture device, while the pattern is projected on the object, to capture a second image of the object, wherein the second image that depicts the projected pattern has a lower resolution than the first image;
matching portions of the pattern in the second image, having the lower resolution, to corresponding portions of the pattern in respective second images captured at other discrete angles so as to spatially align neighboring second images captured at respective angles while the pattern is projected on the object;
determining respective first images that correspond to and are captured at the same discrete angles as the respective second images that are spatially aligned, wherein the respective first images have higher resolution than the respective second images;
replacing the aligned respective second images with the respective first images; and
generating, using the respective first images that replace the aligned respective second images, a three-dimensional (3D) visualization of the object.

2. The method of claim 1, wherein the projector is configured to be fixed from a perspective of the object, and wherein causing the incremental relative rotation of the projector with respect to the image-capture device comprises causing a respective incremental relative rotation of the image-capture device relative to the object.

3. The method of claim 1, wherein the object is on a rotatable surface to which the projector is coupled, and wherein causing the incremental relative rotation of the projector with respect to the image-capture device comprises causing the rotatable surface to rotate relative to the image-capture device, wherein the image-capture device remains stationary.

4. The method of claim 1, wherein the image-capture device is coupled to a rotatable surface, and wherein causing the incremental relative rotation of the projector with respect to the image-capture device comprises causing the rotatable surface to rotate relative to the projector, wherein the projector remains stationary.

5. The method of claim 1, wherein the projector includes a light source, and wherein causing the projector to project the pattern on the object comprises causing the light source to project the pattern on the object.

6. The method of claim 5, wherein the light source includes an electromagnetic radiation source configured to project the pattern on the object as one or more of (i) a visible light, and (ii) an invisible light.

7. The method of claim 1, further comprising causing the image-capture device to capture images of the object from multiple elevations, with respect to the object, at a given angle of rotation.

8. A system, comprising:
a rotatable surface;
a projector coupled to the rotatable surface;
an image-capture device, wherein the rotatable surface and the projector are configured to rotate relative to the image-capture device; and
one or more computing devices configured to cause rotation of the rotatable surface and in communication with the image-capture device and the projector, wherein the one or more computing devices are further configured to:
cause the rotatable surface and the projector to incrementally rotate through multiple discrete angles relative to the image-capture device;
at each angle of the multiple discrete angles:
cause the image-capture device to capture a first image of an object placed on the rotatable surface;

cause the projector to project a pattern on the object, after the first image is captured; and cause the image-capture device, while the pattern is projected on the object, to capture a second image of the object, wherein the computing device is configured to cause the image-capture device to capture an image of higher resolution when capturing the first image than when capturing the second image that depicts the projected pattern;

matching portions of the pattern in the second image, having the lower resolution, to corresponding portions of the pattern in respective second images captured at other discrete angles so as to spatially align neighboring second images captured at respective angles while the pattern is projected on the object;

determining respective first images that correspond to and are captured at the same discrete angles as the respective second images that are spatially aligned, wherein the respective first images have higher resolution than the respective second images; and replacing the aligned respective second images with the respective first images; and generating, using the respective first images that replace the aligned respective second images, a three-dimensional (3D) visualization of the object.

9. The system of claim 8, wherein the projector is affixed to the rotatable surface.

10. The system of claim 8, wherein the one or more computing devices are configured to cause the rotatable surface and the projector to rotate such that the projector: (i) is configured to be fixed from a perspective of the object, and (ii) is configured to rotate relative to the image-capture device.

11. The system of claim 8, wherein the one or more computing devices are configured to cause a first image-capture device to capture the first image and to cause a second image-capture device to capture the second image, wherein the second image-capture device is configured to differ from the first image-capture device with respect to one or more imaging parameters including image resolution, aperture, and focal depth.

12. The system of claim 11, wherein the projector comprises an electromagnetic radiation source configured to project the pattern on the object as one or more of (i) a visible light, and (ii) an invisible light, and wherein the second image-capture device is capable of capturing images depicting the pattern projected by the electromagnetic radiation source on the object.

13. The system of claim 12, wherein the electromagnetic radiation source includes a laser source.

14. The system of claim 8, wherein the one or more computing devices are configured to cause the projector to emit laser beams of different colors to project the pattern on the object.

15. The system of claim 8, wherein the one or more computing devices are configured to cause the rotatable surface to incrementally rotate to the multiple discrete angles through a 360° rotation.

16. The system of claim 8, wherein the one or more computing devices are configured to cause the projector to project the pattern such that the pattern depicts more than one color.

17. A non-transitory computer readable medium having stored thereon instructions executable by a computing device to cause the computing device to perform functions comprising:

causing a rotatable surface and an image-capture device coupled to the rotatable surface to incrementally rotate through multiple discrete angles relative to a projector;

at each angle of the multiple discrete angles:
causing the image-capture device to capture a first image of an object;
causing the projector to project a pattern on the object, after the first image is captured; and
causing the image-capture device, while the pattern is projected on the object, to capture a second image of the object, wherein the computing device is configured to cause the image-capture device to capture an image of higher resolution when capturing the first image than when capturing the second image;

matching portions of the pattern in the second image, having the lower resolution, to corresponding portions of the pattern in respective second images captured at other discrete angles so as to spatially align neighboring second images captured at respective angles while the pattern is projected on the object;

determining respective first images that correspond to and are captured at the same discrete angles as the respective second images that are spatially aligned, wherein the respective first images have higher resolution than the respective second images; and replacing the aligned respective second images with respective first images; and generating, using the respective first images that replace the aligned respective second images, a three-dimensional (3D) visualization of the object.

18. The non-transitory computer readable medium of claim 17, wherein, upon causing the rotatable surface and the image-capture device to rotate to a given angle, the instructions are further executable by the computing device to cause the computing device to perform functions comprising:

causing the projector to switch off pattern projection on the object;

causing the image-capture device to capture a respective first image of the object from the given angle;

causing the projector to project the pattern on the object; and causing the image-capture device to capture a respective second image of the object.

19. The non-transitory computer readable medium of claim 17, wherein the projector is configured to be fixed from a perspective of the object, and wherein the function of causing the rotatable surface and the image-capture device to incrementally rotate through the multiple discrete angles relative to the projector comprises causing a respective incremental rotation of the image-capture device relative to the object.

* * * * *